Sept. 2, 1952      T. L. McNAMARA      2,609,277

CONTACTING OF IMMISCIBLE LIQUIDS

Filed Feb. 24, 1947      2 SHEETS—SHEET 1

INVENTOR
T. L. McNAMARA

BY *Hudson and Young*

ATTORNEYS

Sept. 2, 1952      T. L. McNAMARA      2,609,277
CONTACTING OF IMMISCIBLE LIQUIDS
Filed Feb. 24, 1947      2 SHEETS—SHEET 2

INVENTOR
T. L. McNAMARA
BY Hudson and Young
ATTORNEYS

Patented Sept. 2, 1952

2,609,277

UNITED STATES PATENT OFFICE 2,609,277

CONTACTING OF IMMISCIBLE LIQUIDS

Timothy L. McNamara, Bartlesville, Okla., assignor to Phillips Petroleum Company, a corporation of Delaware Application February 24, 1947, Serial No. 730,648

18 Claims. (Cl. 23—310)

1

This invention relates to an improved method and apparatus for contacting immiscible liquids having different specific gravities.

Various proposals have been made in the past for contacting immiscible liquids as in solvent extraction, treating processes, etc. For example in solvent extraction of a material to be purified or fractionated by liquid-liquid extraction with a selective solvent for certain components, as in the solvent extraction of lubricating oils, solvent extraction of mixtures of hydrocarbons of varying degrees of unsaturation or aromaticity, it has been common practice to continuously countercurrently contact the liquid material to be purified or resolved into fractions and the solvent in a vertical column. Likewise in the chemical refining of hydrocarbons, such as the treatment of hydrocarbons with liquid reagents such as sulfuric acid, aqueous caustic solutions, aqueous copper solutions such as are used in the so-called copper sweetening, it is customary to intimately agitate the liquid hydrocarbon and the liquid reagent for the desired length of time and then allow separation of the mixture into a treated hydrocarbon layer and a reagent layer which are separately withdrawn. Generally speaking the prior art techniques for liquid-liquid contacting have not been entirely satisfactory for a number of reasons such as undue complexity, low contacting efficiency, low throughput, inadequate mixing, formation of emulsions which do not quickly and readily separate, etc.

The principal object of the present invention is to provide a method and apparatus for contacting immiscible liquids having different specific gravities. Another object is to provide such a method and apparatus which are simple and economical to install and operate. Another object is to provide such a method and apparatus which accomplish better contacting and higher throughput. Another object is to provide a method and apparatus as in the foregoing objects which enables better contact and higher throughput of the material being extracted or treated than is possible in liquid-liquid countercurrent contacting proposals wherein both liquids are supplied continuously under pressure to the contacting tower. Numerous other objects will more fully hereinafter appear.

2

Figure 1:
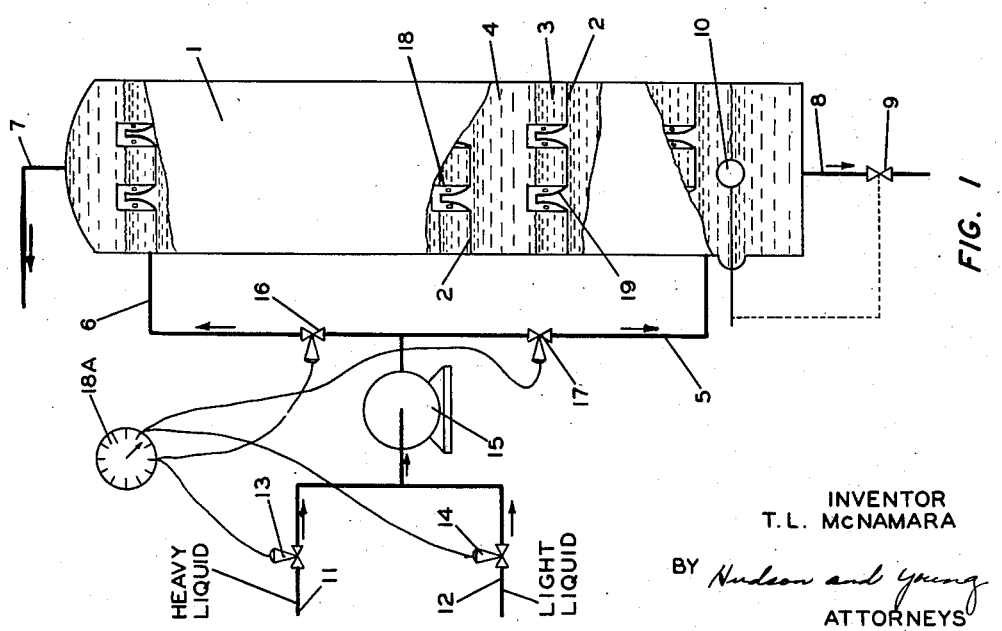
Fig. 1 is a diagrammatic illustration of one embodiment of the present invention.
Figure 3:
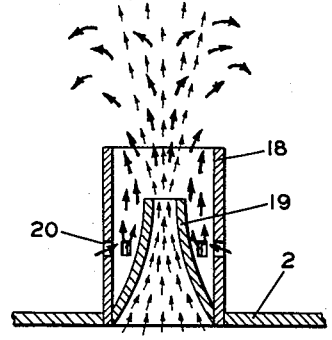

Fig. 3 is a detailed vertical sectional view of a portion of the tray and eductor arrangement used in Fig. 1.

Figure 2:
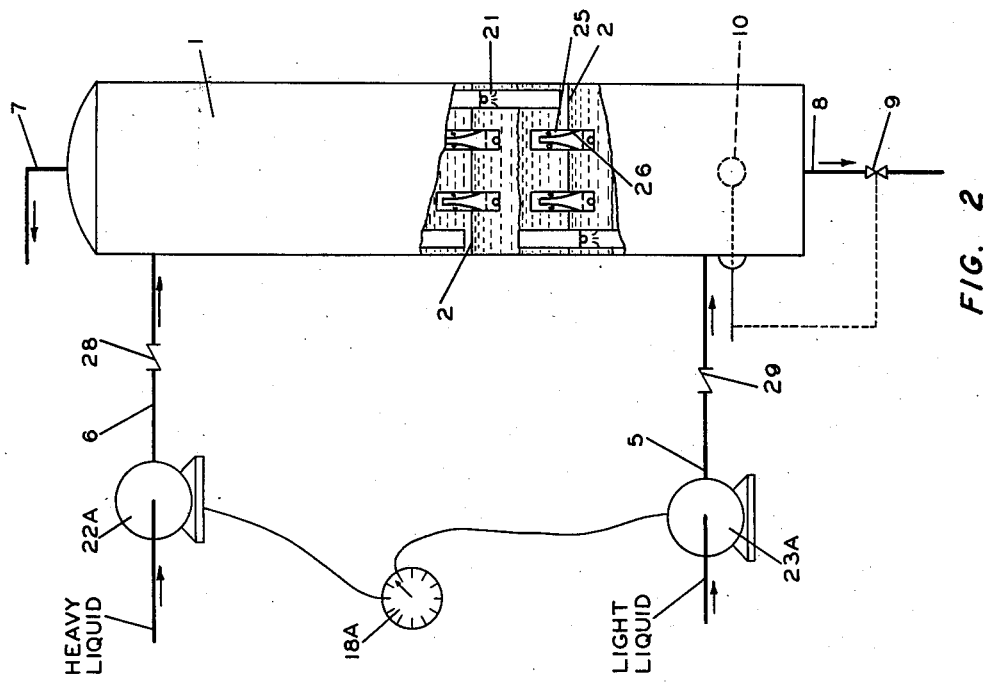
Fig. 2 is a drawing of an alternative embodiment of the present invention.
Figure 4:
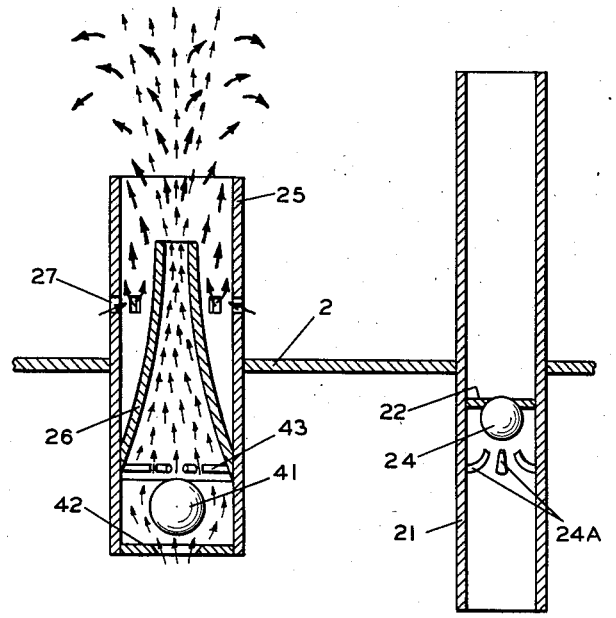

Fig. 4 is a detailed vertical sectional view showing the arrangement of eductors and downcomers used in Fig. 2.

Figure 5:
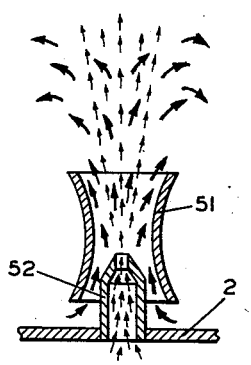

Fig. 5 shows still further modification of the eductors.

Figure 6:
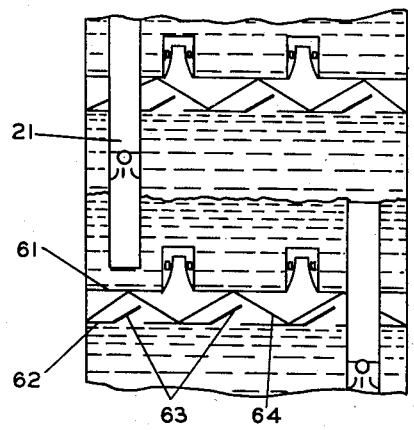

Fig. 6 shows diagrammatically a portion of a modified column.

The present invention has both method and apparatus aspects. In its method aspect, the present invention is a method of effecting liquid-liquid contacting of two immiscible liquids of different specific gravities in a vertical contacting column provided with a plurality of vertically spaced horizontal trays, each of the trays being equipped with one or more eductors having their suction inlet in free communication with the space above the tray and adapted to jet the lighter liquid from the space below the tray through the tray vertically into the space above the tray and to suck the heavier liquid resting on the tray into intimate admixture with the lighter liquid jetted therethrough. This method preferably comprises first feeding the lighter liquid continuously into the bottom of the column and causing the lighter liquid to jet upwardly through the eductors or aspirators and to suck the heavier liquid from the layers thereof on the trays into intimate admixture with the lighter liquid followed by gravity separation and withdrawing the lighter liquid from the top of the column, then discontinuing feeding and withdrawal of said lighter liquid and feeding the heavier liquid into the top of the column and causing same to flow downwardly through the column and withdrawing the heavier liquid from the bottom of the column. This later action is continued until the heavier liquid reposing on the trays of the column is replenished to the desired extent. Feeding and withdrawal of the heavier liquid are then discontinued and feeding and withdrawal of the lighter liquid is renewed. These two series of steps are continued in alternating relationship for a plurality of cycles and usually for an indefinite period of a time.

The apparatus of the present invention may comprise, in combination, a vertical column having a plurality of vertically spaced horizontal trays separating the column into a plurality of superimposed contacting and settling zones, eductors or aspirators in each tray arranged to discharge lighter liquid from below the tray through the tray into the space thereabove, these eductors or aspirators having their suction inlets in free communication with the space above the tray and being arranged to suck the heavier liquid resting on the trays into intimate admixture with the lighter liquid discharged through the eductors or aspirators from the space below, conduit means for introducing the lighter liquid under pressure to the bottom of the column, conduit means for withdrawing the lighter liquid from the top of the column, conduit means for introducing heavier liquid to the top of said column, conduit means for withdrawing heavier liquid from the bottom of said column, and means for alternately introducing and withdrawing said lighter liquid in one portion of the cycle and introducing and withdrawing the heavier liquid in the other portion of the cycle.

My invention is based on the discovery that by intermittently and alternately carrying out introduction and withdrawal of the heavier liquid and introduction and withdrawal of the lighter liquid, higher throughput and better contacting are obtained. My invention is directly contrary to the teachings of the prior art which indicates that both the heavier and the lighter liquids should be introduced continuously, and simultaneously to the column. Despite the contrary teachings of prior art, I have found by actual tests that intermittent or alternate introduction of the lighter liquid and the heavier liquid gives much improved results over the continuous processes as now practiced in the art.

Thus operation in accordance with the present invention is a continuous cycle of charging the liquids alternately. First light liquid is forced upwardly through the jets to be intimately mixed with the layers of heavier liquid on the trays, intimate contacting of the heavier and lighter liquids takes place in the jets and immediately thereabove, and then the two liquids separate under the influence of gravity, the heavier liquid falling back onto the tray by virtue of its higher density and the lighter liquid merging with the layer of lighter liquid in the upper portion of the space between the trays. Then the flow of lighter liquid is discontinued and the heavier liquid is introduced, the heavier liquid flowing downwardly through the trays, and sequentially replenishing the heavier liquid on the trays to the desired extent. Upon resuming introduction of the lighter liquid, it passes upwardly first through layers of heavier liquid which are more spent and progressively through layers of heavier liquid which are less and less spent.

The present invention is adapted to the treatment of any two immiscible liquids having specific gravities sufficiently different from one another so that they may be readily separated under the influence of gravity. The invention may be applied to the solvent extraction of hydrocarbon mixtures. For example, it may be used for the solvent extraction of lubricating oils. Similarly it may be used to effect the resolution of mixtures of hydrocarbons of varying degrees of unsaturation. For example, it may be used to separate butene from butane or to separate butadiene from butene or to separate butene and butadiene from butane. The present invention may also be applied to effect the chemical treatment of any material which is liquid under the extraction conditions with any chemical reagent which is in liquid phase under the conditions of the contacting. Examples are: the treatment of sour gasoline with aqueous cupric salt solution in accordance with the so-called "copper sweetening" process, the refining of hydrocarbon oils and mixtures of hydrocarbons with sulfuric acid, the treatment of hydrocarbon oils and mixtures of hydrocarbons with aqueous caustic solutions, for example the treatment of gasoline with caustic to remove mercaptans and sulfur compounds. Many other applications of the liquid-liquid contacting method and apparatus of the present invention will be obvious to those skilled in the art.

The present invention makes possible the efficient and effective use of a tray column for liquid-liquid contacting. It does this by permitting a large pressure drop across the tray. It will be evident that if one of the liquids is stationary or static and if the other is introduced under pressure, the pressure differential will be numerically equal to the pressure at which the other liquid is introduced. If, on the contrary, both the heavier and the lighter liquids are introduced simultaneously under pressure, the total pressure differential or total pressure drop across all of the trays in the column will be equal to the difference in pressure and generally this will not be large. Where both heavier and lighter liquids are introduced and withdrawn simultaneously in counter-current and continuous streams, the maximum pressure drop obtainable across any plate must be limited by the hydrostatic head between this plate and the lower plate. This generally, in the conventional column, will not exceed one pound per square inch. In contrast the present invention makes possible the use of a large pressure drop across each plate limited only by the structural strength of the column. While extremely large pressure drops across each tray may be obtained, generally however, most operations will require only a 5 to 50 pound pressure drop. As a result my invention makes possible the use of a tray type tower in which any one of numerous devices (e. g. eductors or aspirators, perforated plates, jets, porous plates, etc.) requiring a substantial pressure drop for the intimate and efficient contacting of immiscible fluids of different specific gravities may be employed. This invention will apply to gas-liquid contacting as well as liquid-liquid contacting, however, it will probably be most applicable to the latter.

Referring now to Fig. 1 of the accompanying drawings, which illustrates a tower without downcomers, the tower 1 is provided with a plurality of horizontal trays 2. Tower 1 is operated liquid-full. A layer 3 of heavier liquid rests on each of the trays 2. A layer 4 of the lighter liquid fills the space between the trays 2 above the layer 3. Conduit 5 is provided for the introduction of the lighter liquid to the bottom of tower 2. Conduit 6 is similarly provided for the introduction of the heavier liquid to the top of the column. Treated or extracted lighter liquid is withdrawn from the top of the column 1 via line 7. Likewise line 8 is provided for the withdrawal of heavier liquid when heavier liquid is being introduced via line 6. A float-controlled valve 9 is disposed in conduit 8 and this valve 9 is actuated by the float 10. Float 10 is adapted to rest at the interface between the layer of heavier liquid in the extreme bottom of column 1 and the layer of lighter liquid thereabove. Heavy liquid is introduced to the system via line 11 from a source not shown. Lighter liquid is similarly introduced via line 12. Lines 11 and 12 are provided with motor valves 13 and 14 respectively and these motor valves 13 and 14 are adapted to be opened and closed alternately in a manner which will presently appear. Pump 15 is arranged to pump either heavier liquid into the top of tower 1 via line 6 or lighter liquid into the bottom of tower 1 via line 5. Motor valves 16 and 17 are provided in lines 6 and 5, respectively.

An electrical timing device 18A of known type is arranged to alternately (1) open valves 13 and 16 to allow heavier liquid to be pumped into the top of column 1, valves 14 and 17 meanwhile being closed and (2) open valves 14 and 17 to allow light liquid to be pumped into bottom of column 1, valves 13 and 16 meanwhile being closed.

In Figs. 1 and 3 the tubular portion of the eductors or aspirators bears numeral 18 and extends upwardly from tray 2. Co-operating with the tube 18 is the jet 19 arranged concentrically therewith. Openings 20 are provided in tube 18 above tray 2 for allowing heavier liquid to be sucked inwardly into the lighter liquid being jetted upwardly through jet 19.

Referring to Fig. 2, the arrangement is generally similar to that of Fig. 1, tower 1 being provided with the horizontal trays 2 as before. However in Fig. 1 the heavy liquid must pass downwardly through the jets 19 when it is being pumped whereas in Fig. 2 provision is made for allowing the downwardly flowing heavy liquid to flow through downcomers 21 which are equipped with check valves for allowing liquid to flow downwardly but preventing the reverse flow of liquid. As is shown in Fig. 4, the check valves may take the form of a transverse plate 22 extending across the downcomer 23 and having a hole in its center. A ball 24 is adapted to be pressed upwardly in seating relationship with plate 22 when lighter liquid is being pumped into the bottom of column 1. However the ball 24 may freely move downwardly to allow the heavier liquid to flow downwardly through downcomers 23 when heavier liquid is being introduced into the top of column 1. If desired, means such as prongs 24A may be provided to limit the downward movement of balls 24 so that they do not become displaced.

Also in Fig. 2 a different type of eductor or aspirator is shown. The eductors in Figs. 2 and 4 comprise tubular elements 25 which extend downwardly below the trays 2. Jets 26 start below trays 2 and extend upwardly therein to a point well above trays 2. Openings 27 are provided in tubes 25 above trays 2 to allow the heavier liquid resting on the trays 2 to be freely sucked through these openings into admixture with the lighter liquid being jetted upwardly through jets 26.

The heavier liquid is introduced to the top of column 1 via line 6 which is fed by pump 22A. The lighter liquid is introduced to the bottom of column 1 via line 5 which is fed by pump 23A. Pumps 22 and 23 are driven by electric motors (not shown) which are timed by the timing device 18A. Timing device 18A controls pumps 22A and 23A in known manner.

Check valves 28 and 29 are provided in conduits 6 and 5 respectively of Fig. 2 in order to allow the flow of liquid therethrough toward column 1 but to prevent the reverse flow of liquid. Provision of such check valves is unnecessary in Fig. 1 because the motor valves 16 and 17, when closed, positively prevent flow of liquid in either direction.

In Fig. 5 the tubular members 51 surrounding the jets 52 are curved so as to give better contacting efficiency. The tubular elements 51 are concentric with jets 52. The elements 51 are mounted above trays 2 in any suitable manner (means not shown) in order to allow the heavier liquid to be sucked inwardly and upwardly around the lower edge of element 51 into intimate admixture with the jetted lighter liquid.

As a specific example of the present invention, the caustic scrubbing of gasoline will be described.

Gasoline cycle

Gasoline enters the bottom of tower 1 under pump pressure and is forced upwardly through the series of jet trays 2. Each tray 2 contains a number of jets through which the gasoline passes and is therein intimately mixed with caustic on the plate. On leaving the jet caustic settles from the gasoline and falls back onto the trays where it again contacts incoming gasoline. The gasoline passes upwardly from tray to tray and is similarly contacted on each plate. The treated gasoline is removed via line 7.

Caustic cycle

At fixed periods the flow of gasoline is stopped by the automatic arrangement shown and caustic is pumped into the top of the tower via line 6. The caustic, having a greater specific gravity than the gasoline, will overflow through the openings of jets 19 of Fig. 1 or through the downcomers 21 of Fig. 2 from tray to tray and is withdrawn from the bottom via line 8.

The ratio of gasoline to caustic is controlled by the length of each cycle or by the size of the pumps in Fig. 2. Thus in Fig. 1 if it were desired to treat gasoline with caustic in the ratio of one volume of caustic to ten volumes of gasoline, the caustic cycle would be one minute in length and the gasoline cycle ten minutes. However, with the arrangement of Fig. 1, the period of each cycle can be varied from a few seconds to an indefinite number of hours.

Similarly in Fig. 2 if it is desired to treat in the ratio of one volume of caustic to ten volumes of gasoline, if the pumps are of the same size, the heavier liquid pump is run for $\frac{1}{10}$ as long as the lighter liquid pump.

In order to prevent downflow of the heavier liquid through the jets 26 of Figs. 2 and 4 and to thereby enable maintenance of the interface level with the top of downcomers 21 with consequent better and more efficient mixing, I provide check valves in association with the eductors or aspirators. These check valves allow free upward movement of the lighter liquid through the jets 26 but prevent reverse flow of liquid when heavier liquid is being pumped into the top of the column. These check valves may take the form shown in detail in Fig. 4 wherein the ball 41 is adapted to be pushed down into seating relationship with the seat provided by annular transverse disk 42. Prongs 43 are provided to prevent ball 41 from being carried up so far as to interfere with upward flow of lighter liquid.

Fig. 6 shows a still further way of attaining the same result mentioned in the preceding paragraph. Downcomers 21 like those of Figs. 2 and 4 are provided. However instead of check valves associated with the eductors or aspirators, in Fig. 6 I use a double tray composed of parallel plates 61 and 62 and provide flapper valves 63 in the lower plate 62 to allow lighter liquid to pass upwardly into the space therebetween and thence through the eductors or aspirators but preventing the reverse flow of liquid. One advantage of this type of construction is that by use of the truss arrangement 64 between the plates 61 it is possible to provide a light but exceedingly strong tray assembly enabling use of very high liquid pressures with correspondingly high pressure drops across the eductors or aspirators without the disadvantage of bending or flexing of the trays. Another advantage is that the construction of Fig. 6 is simpler and cheaper to build than the individual check valves associated with each eductor as in Fig. 2. Furthermore the arrangement of Fig. 6 enables the staggering of the flapper valves 63 with respect to the eductors or aspirators so that the tendency of liquid to pass straight through is eliminated.

It will be understood that instead of tubular downcomers 21 I may use any other type such as that formed by a vertical partition across one side of the column and a flapper valve in said partition, preferably at a point near the next lower tray.

One advantage of the use of separate downcomers 21 as in Figs. 2 and 6 is that the limitation on downflow of heavier liquid through the jets as in Fig. 1 is overcome. Ordinarily the jets are relatively small, say 3/8 of an inch across and the liquid flow therethrough is not great. Another advantage is that better replenishment of the heavier liquid is obtained since the downcoming liquid is forced to flow across the tray and then upwardly in order to pass through the next downcomer 21 to the next tray.

The use of the downcomers 21 of Figs. 2 and 6 is further advantageous over employment of the jets 19 of Fig. 1 for downflow of the heavier liquid when it is being introduced into the top of the column. The principal advantage of the use of such downcomers 21 is that they can be designed to extend well above the tops of the jets so that the interface between the layers of lighter and heavier liquid between adjacent trays can be held well above the tops of the jets and even well above the tops of the cylinders 18 or 25 or the Venturi tubes 51. This often gives a much better degree of contacting and higher efficiency than are possible in the case where, as in Fig. 1, the level of the interface is of necessity even with the top of the jets 19. For example I have found by actual tests using water as the heavier liquid to extract benzoic acid from a solution thereof in kerosene as the lighter jetted liquid that the most effective mixing and maximum efficiency were obtained at an interface height of 8 inches above the top of the jet. The optimum height of interface will depend upon the particular pair of liquids used and the particular conditions employed.

It is noteworthy that the apparatus of my invention prevents downflow of heavier liquid while the lighter liquid is being pumped. Thus in Fig. 1 it is impossible for heavier liquid to flow down through the jets 19 when the lighter liquid is being introduced via line 5. Similarly in Fig. 2 when the lighter liquid is on-stream a head of liquid in downcomers 21, produced by the pressure of the lighter liquid, closes the check valves therein so that heavy liquid (and lighter liquid also of course) cannot flow upward in the downcomers.

It should be noted that, although the above example refers to dispersal of the lighter liquid, the heavier liquid can also be dispersed by reversing the flow and introducing the heavier liquid under pressure through a dispersing device downward, from plate to plate and conducting the lighter liquid upward from plate to plate through suitably designed downcomers.

From the foregoing description of detailed embodiments of my invention, many advantages thereof will be apparent to those skilled in the art. The principal advantage is that higher throughput and better contacting are obtained. Another advantage is that the treatment or extraction is carried out automatically. Another advantage is that the equipment requirements are simple and the apparatus is rugged and adapted to long life. Another advantage is that a minimum of maintenance is required. Many other advantages will be apparent to those skilled in the art.

I claim:

1. A method of effecting liquid-liquid contacting of two immiscible liquids of different specific gravities in a vertical contacting column provided with a plurality of vertically spaced horizontal trays each of which is equipped with aspirators having their suction inlet in free communication with the space above the tray and adapted to jet the lighter liquid from the space below the tray through the tray vertically into the space above the tray and to suck the heavier liquid on the tray into intimate admixture therewith, which comprises first feeding the lighter liquid continuously into the bottom of the column and causing same to jet upwardly through the aspirators and to suck the heavier liquid into intimate admixture with the lighter liquid followed by gravity separation and withdrawing the lighter liquid from the top of the column, then discontinuing feeding and withdrawal of said lighter liquid and feeding the heavier liquid into the top of the column and causing same to flow downwardly through the column and withdrawing the heavier liquid from the bottom of the column, then discontinuing said last-named series of steps and resuming said first-named series of steps, and continuing said first-named and said second-named series of steps in alternating relationship for a plurality of cycles.

2. A method of effecting liquid-liquid contacting of two immiscible liquids of different specific gravities in a vertical contacting column provided with a plurality of superimposed contacting and settling zones formed between vertically spaced horizontal trays each of which is equipped with aspirators arranged to jet the lighter liquid upwardly through the tray and to suck the heavier liquid on the tray into intimate contact with the lighter liquid in the space above the aspirators which comprises alternately (1) feeding the lighter liquid continuously into the bottom of the column, causing the lighter liquid to jet upwardly successively through the trays, sucking the heavier liquid on the trays into admixture with the lighter liquid and intimately contacting the heavier and the lighter liquids above the aspirators and then causing the heavier liquid to fall back onto the tray and the lighter liquid to rise into the upper portion of the zone and withdrawing the lighter liquid from the top of the column, and (2) feeding the heavier liquid into the top of the column, causing the heavier liquid to flow downwardly through the column and withdrawing the heavier liquid from the bottom of the column, repeating said first-named and said second-named series of steps in alternating relationship for a plurality of cycles.

3. The method of claim 2 wherein the ratio in which the heavier and the lighter liquids are contacted is controlled by the ratio of the length of time of the second-named and the first-named series of steps and is identical with said ratio of said lengths of time.

4. The method of contacting two immiscible liquids of different specific gravities which comprises continuously introducing the lighter liquid through a relatively stationary body of the heavier liquid in a contacting zone, sucking the heavier liquid into intimate admixture with the lighter liquid by jetting the lighter liquid upwardly through an aspirator having its suction inlet in free communication with said body of heavier liquid thereby causing the heavier and the lighter liquids to be intimately contacted in the space above said aspirator, allowing gravity separation of the admixed liquids in the space surrounding the space wherein intimate contacting occurs whereby said lighter liquid rises forming an upper layer and said heavier liquid falls forming a lower layer, continuously withdrawing the supernatant layer of the lighter liquid at a rate corresponding to the rate of introduction thereof, periodically discontinuing said introduction and withdrawal of said lighter liquid and introducing heavier liquid and withdrawing heavier liquid so as to replenish the body of heavier liquid in said zone, and thereafter resuming said introduction and withdrawal of said lighter liquid.

5. Apparatus for contacting two immiscible liquids having different specific gravities comprising, in combination, a vertical column having a plurality of vertically spaced horizontal trays separating same into a plurality of superimposed contacting and settling zones, aspirators each comprising a vertically disposed tubular conduit means extending upwardly from its respective tray and having at least one opening through its side above said tray, a nozzle attached to said tube disposed within said tube having an inlet substantially the same area as the area of said tube and having an outlet above said opening but below the upper outlet of said tube, and in each tray arranged to discharge lighter liquid from below the tray through the tray into the space thereabove, said aspirators having their suction inlets in free communication with the space above the trays and being arranged to suck heavier liquid resting on the trays into intimate admixture with the lighter liquid discharged through the aspirators, conduit means for introducing lighter liquid under pressure to the bottom of said column, conduit means for withdrawing lighter liquid from the top of said column, conduit means for introducing heavier liquid to the top of said column, conduit means for withdrawing heavier liquid from the bottom of said column, and means for alternately introducing and withdrawing said lighter liquid in one portion of the cycle and introducing and withdrawing said heavier liquid in the other portion of the cycle.

6. Apparatus as in claim 5 including in addition a valve in said conduit means for withdrawing heavier liquid from the bottom of said column, a float in the bottom of said column adapted to float at the interface of the bottom layer of heavier liquid and the layer of lighter liquid immediately thereabove, and means for mechanically connecting said float with said valve in such manner as to hold said interface at a predetermined substantially constant level.

7. Apparatus as in claim 5 wherein said aspirators comprise tubes projecting vertically upwardly and located above each of said trays and jets within said tubes and in free communication with the space below each tray, said jets being concentric with said tubes and terminating at a point substantially below the tops of said tubes, there being at least one opening substantially below the point of termination of said jets for allowing heavier liquid on the trays to be sucked freely into the tubes and thence to pass upwardly into intimate admixture with the jetted lighter liquid.

8. Apparatus as in claim 5 including in addition check valves in each of said conduits for conveying lighter liquid to the bottom of said column and said conduit for conveying heavier liquid to the top of said column for allowing liquid to flow in said conduits toward the column but preventing the reverse flow of liquid.

9. Apparatus as in claim 5 wherein said aspirators comprise jets mounted in said trays and arranged to jet the lighter liquid therethrough into the space above the trays and tubes surrounding said jets, and additionally including downcomers with their tops substantially above said jets whereby the interface is maintained well above the top of said jets, check valves associated with said downcomers for allowing liquid to flow freely downwardly but preventing upward flow of liquid therethrough, and means for allowing liquid to flow freely upwardly through said jets but preventing liquid from flowing downwardly through said jets.

10. Apparatus as in claim 5 including downcomers for allowing heavier liquid to flow downwardly from tray to tray, means for preventing upward flow of liquid through said downcomers, and means for allowing upward flow of lighter liquid through said aspirators but preventing downward flow of liquid through said aspirators, said downcomers being arranged to maintain the interface well above the top of said aspirators.

11. Apparatus for contacting two immiscible liquids having different specific gravities comprising, in combination, a vertical column having a plurality of vertically spaced horizontal trays separating same into a plurality of superimposed contacting and settling zones, aspirators each comprising a vertically disposed tubular conduit means extending upwardly from its respective tray and having at least one opening through its side above said tray, a nozzle attached to said tube disposed within said tube having an inlet substantially the same area as the area of said tube and having an outlet above said opening but below the upper outlet of said tube, and in each tray arranged to discharge lighter liquid from below the trays through the tray into the space thereabove, said aspirators having their suction inlets in free communication with the space above the trays and being arranged to suck heavier liquid resting on the trays into intimate admixture with the lighter liquid discharged through the aspirators, a pump, a conduit leading from the outlet of said pump and adapted to introduce the discharge of said pump into the top of said column, a second conduit leading from the outlet of said pump and adapted to introduce the discharge from said pump into the bottom of said column, a conduit for withdrawing said lighter liquid from the top of said column, a conduit for withdrawing said heavier liquid from the bottom of said column, a conduit for admitting said heavier liquid to the inlet side of said pump, a second conduit for admitting the lighter liquid to the inlet side of said pump, motor valves in each of said conduits leading to the inlet of said pump and said conduits leading from the outlet of said pump and timing means for controlling said motor valves, said timing means being adapted and arranged to automatically and alternately (1) open the motor valves in the conduit leading said heavier liquid to the inlet of said pump and in the conduit leading from the outlet of said pump to the top of said column and close the motor valves in said conduit leading said lighter liquid to the inlet of said pump and in said conduit from the outlet of said pump to the bottom of said column and (2) open the motor valves in said conduit leading said lighter liquid to the inlet of said pump and in said conduit leading from the outlet of said pump to the bottom of said column and close the motor valves in said conduit leading the heavier liquid to the inlet of said pump and in said conduit from the outlet of said pump to the top of said column.

12. Apparatus for contacting two immiscible liquids having different specific gravities comprising, in combination, a vertical column having a plurality of vertically spaced horizontal trays separating same into a plurality of superimposed contacting and settling zones, aspirators each comprising a vertically disposed tubular conduit means extending upwardly from its respective tray and having at least one opening through its side above said tray, a nozzle attached to said tube disposed within said tube having an inlet substantially the same area as the area of said tube and having an outlet above said opening but below the upper outlet of said tube, and in each tray arranged to discharge lighter liquid from below the tray through the tray into the space thereabove, said aspirators having their suction inlets in free communication with the space above the trays and being arranged to suck heavier liquid resting on the trays into intimate admixture with the lighter liquid discharged through the eductors, downcomers arranged to convey heavier liquid from each tray to the next lower tray and from the bottom tray to the bottom of the column, check valves in each of said downcomers arranged to allow liquid to flow downwardly therethrough but to prevent upward flow of liquid therethrough, a conduit for conveying lighter liquid to the bottom of said column, a conduit for conveying heavier liquid to the top of said column, a pump in each of said conduits, a conduit for withdrawing lighter liquid from the top of said column, a conduit for withdrawing heavier liquid from the bottom of said column, and timing means for intermittently and alternately operating said pumps.

13. Apparatus for contacting two immiscible liquids having different specific gravities comprising a vertical column, a plurality of pairs of adjacent plates extending across said column and dividing same into a plurality of contacting and settling zones, downcomers arranged to convey heavier liquid from one zone to the next zone therebelow, check valve means associated with said downcomers for allowing free flow of heavier liquid downwardly therethrough but for preventing the upward flow of liquid therethrough, eductors each comprising a vertically disposed tubular conduit means extending upwardly from its respective upper plate and having at least one opening through its side above said upper plate, a nozzle attached to said tube disposed within said tube having an inlet substantially the same area as the area of said tube and having an outlet above said opening but below the upper outlet of said tube, and associated with the upper plates of said pairs of plates and arranged to discharge lighter liquid from the space between said plates through the upper plates into intimate contact with the heavier liquid thereabove, downwardly closing check valves associated with the lower plates of said pairs of plates, said downcomers being arranged to maintain the interface well above said eductors, means for alternately supplying heavier liquid to the top of said column and lighter liquid to the bottom of said column, means for withdrawing heavier liquid from the bottom of said column and means for withdrawing lighter liquid from the top of said column.

14. A liquid-liquid contactor comprising in combination a vertical tower, horizontal trays dividing said tower into sections, restricted conduits comprising jet nozzles communicating from the space below to the space above each tray, an annular shield mounted on the tray and spaced from and surrounding the upper end of each jet nozzle, an unrestricted outlet conduit connected to the top of the tower, a second outlet conduit connected to the bottom of said tower, a valve in said second outlet conduit controlling flow therethrough, liquid interface level control means in the bottom section of said tower connnected to control said valve to open when the lowermost liquid exceeds a predetermined height in said bottom section, a first inlet conduit for introducing heavy liquid communicating with the top of said tower, a second inlet conduit for introducing light liquid communicating with the bottom of said tower, pump means for forcing said liquids into said tower through their respective inlet conduits, means preventing back flow in said inlet conduits, and means for alternating the introduction of said light and said heavy liquid through their respective inlet conduits.

15. A liquid-liquid contactor comprising in combination a vertical tower, horizontal trays dividing said tower into sections, conduits communicating from the space below to the space above each tray, an unrestricted outlet conduit connected to the top of the tower, a second outlet conduit connected to the bottom of said tower, a valve in said second outlet conduit controlling flow therethrough, liquid interface level control means in the bottom section of said tower connected to control said valve to open when the lowermost liquid exceeds a predetermined height in said bottom section, a first inlet conduit for introducing heavy liquid communicating with the top of said tower, a second inlet conduit for introducing light liquid communicating with the bottom of said tower, pump means for forcing said liquids into said tower through their respective inlet conduits, means preventing back flow in said inlet conduits, and means for alternating the introduction of said light and said heavy liquid through their respective inlet conduits.

16. A liquid-liquid contactor comprising in combination a vertical tower, horizontal trays dividing said tower into sections, restricted conduits comprising jet nozzles communicating from the space below to the space above each tray, an unrestricted outlet conduit connected to the top of the tower, a second outlet conduit connected to the bottom of said tower, a valve in said second outlet conduit controlling flow therethrough, liquid interface level control means in the bottom section of said tower connected to control said valve to open when the lowermost liquid exceeds a predetermined height in said bottom section, a first inlet conduit for introducing heavy liquid communicating with the top of said tower, a second inlet conduit for introducing light liquid communicating with the bottom of said tower, pump means for forcing said liquids into said tower through their respective inlet conduits, means preventing back flow in said inlet conduits, and means for alternating the introduction of said light and said heavy liquid through their respective inlet conduits.

17. A plural cycle process for contacting two substantially immiscible liquids having different specific gravities in a vertically extending zone, said zone being divided into sections by horizontally disposed perforated trays, comprising forcing the heavy liquid into an upper section of said zone during one cycle while flowing off the displaced light liquid from said upper section and preventing the ingress and egress of the light liquid from a lower section of said zone or the egress of said heavy liquid from said upper section except downwardly through said zone; and then during a second cycle forcing the light liquid into said lower section while flowing off the displaced light liquid from said upper section, preventing the egress of the light liquid from said lower section and preventing the ingress and egress of the heavy liquid from said upper section; and withdrawing the heavy liquid from the bottom of said zone in response to the level of said heavy liquid therein to maintain a predetermined depth of said heavy liquid in the bottom of said zone, said light liquid being forced into said zone under a pressure greater than the difference in head of a column of said heavy liquid as high as the elevation of said upper section over said lower section over a similar column of said light liquid but insufficient to force any of said heavy liquid out of said upper section; said liquids being forced into intimate contact by being forced through said perforated trays during said cycles by said process steps.

18. A plural cycle process for contacting two substantially immiscible liquids having different specific gravities in a vertically extending zone, said zone being divided into sections by horizontally disposed perforated trays, comprising forcing the heavy liquid into an upper section of said zone during one cycle while flowing off the displaced light liquid from said upper section and preventing the ingress and egress of the light liquid from a lower section of said zone or the egress of said heavy liquid from said upper section except downwardly through said zone; and then during a second cycle forcing the light liquid into said lower section while flowing off the displaced light liquid from said upper section, preventing the egress of the light liquid from said lower section and preventing the ingress and degrees of the heavy liquid from said upper section; and withdrawing the heavy liquid from the bottom of said zone in response to the level of said heavy liquid therein to maintain a predetermined depth of said heavy liquid in the bottom of said zone; said liquids being forced into intimate contact by being forced through said perforated trays during said cycles by said process steps.

TIMOTHY L. McNAMARA.

REFERENCES CITED

The following references are of record in the file of this patent:

UNITED STATES PATENTS

| Number | Name | Date |
|---|---|---|
| 2,011,186 | Van Dijck | Aug. 13, 1935 |
| 2,078,403 | Miller | Apr. 27, 1937 |
| 2,191,919 | Thayer | Feb. 27, 1940 |